April 16, 1968 M. F. MARTI 3,378,250
AXLE AND SPRING ASSEMBLY
Filed Nov. 3, 1965
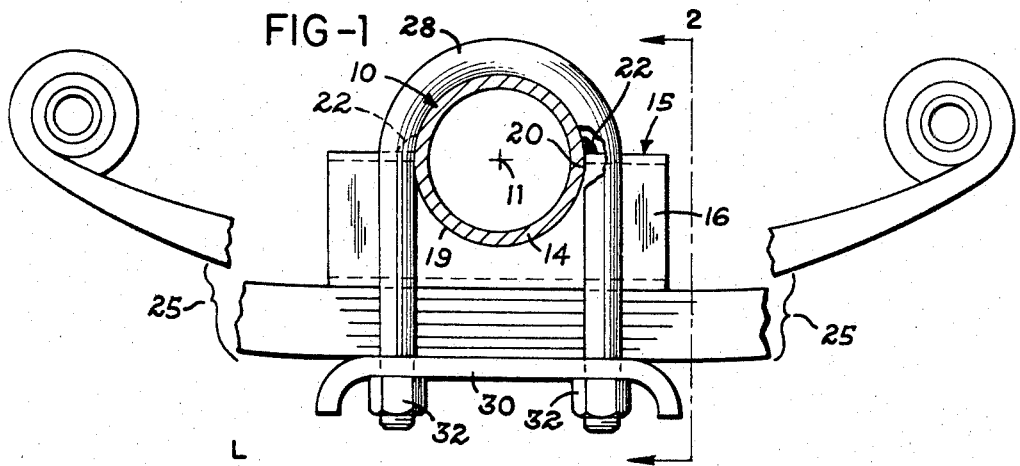
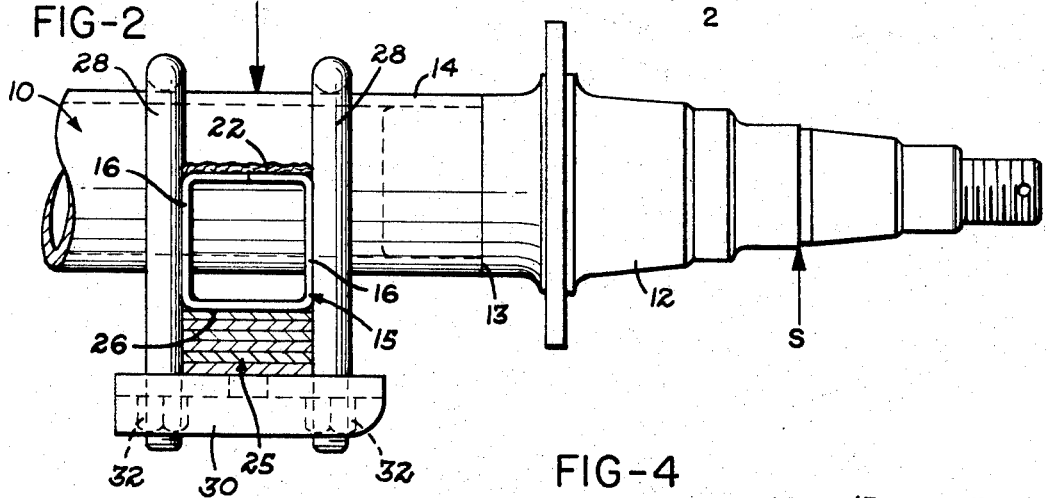
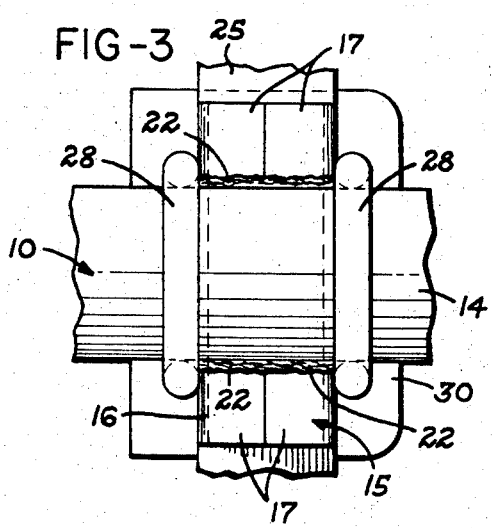
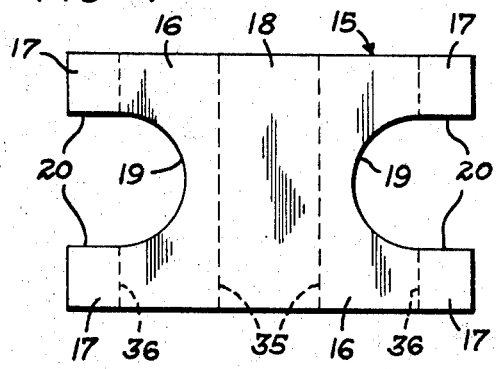
INVENTOR.
MILFORD F. MARTI
BY
Marechal, Biebel, French & Bugg
ATTORNEYS

3,378,250
AXLE AND SPRING ASSEMBLY
Milford F. Marti, Fayette, Ohio, assignor to The Dayton Steel Foundry Company, Dayton, Ohio, a corporation of Ohio
Filed Nov. 3, 1965, Ser. No. 506,290
4 Claims. (Cl. 267—52)

ABSTRACT OF THE DISCLOSURE

A spring support pad formed of sheet metal and secured to an axle by welds exclusively in regions defined by the neutral bending plane of the axle.

---

This invention relates to spring supported axles, and more particularly, to an improved mounting of the spring on the axle to reduce axle failures such as axle breaking or bending.

On many trailing vehicles such as a boat trailer, house trailer, wagon and the like, a wheel supporting axle is commonly connected to the frame of the vehicle by a pair of leaf springs which serve to cushion the load. As a result of this conventional axle mounting when combined with the mounting of the wheels on the cantilevered end portions of the axle extending outwardly from the springs, the axle is subjected to the highest stresses in the areas where the springs are connected to the axle. That is, the upper portion of the axle at the location where the springs are connected is subjected to maximum compression and the lower portion of the axle at this location is subjected to maximum tension. Thus, many axle failures occur in the areas where the springs are connected.

It has been determined that one significant factor causing axle failure is the mounting of spring locating and support pads on the axle by welding the pads to the upper or lower surface of the axle. That is, the spring pads are welded to the axle within the areas of maximum stress so that, if the welding operation reduces the strength of the axle as a result of overheating, undercutting or the like, axle failure is more likely to occur.

Accordingly, a primary object of the present invention is to provide an improved axle and spring assembly wherein the spring locating pads are welded to the axle exclusively in areas of minimum stress so that the welding operation does not effect the strength of the axle.

As another object, the invention provides an axle and spring assembly which provides for optimum strength and is economical in construction.

It is also an object to provide an assembly wherein the spring pads can be conveniently welded from the top of the axle without requiring rotation of the axle during welding.

As a further object, the invention provides a spring pad which is simple and economical in construction and can be easily manufactured for mounting on axles of different sizes.

Other objects and advantages of the invention will be apparent from the following description, the accompanying drawing and the appended claims.

In the drawing:

FIG. 1 is a partially broken away elevational view of an axle and spring assembly formed in accordance with the invention with the axle shown in section;

FIG. 2 is a fragmentary side elevational view of the assembly as viewed along the line 2—2 of FIG. 1;

FIG. 3 is a fragmentary plan view of the assembly shown in FIG. 1; and

FIG. 4 is a developed view of a spring pad as blanked and before forming.

Referring to the drawing which illustrates a preferred embodiment of the present invention, the assembly shown in FIGS. 1–3 includes an elongated tubular axle 10 having a central axis 11 and a spindle portion 12 secured to each end 13 of a cylindrical tubular intermediate portion 14. In a conventional manner, each spindle portion 12 is formed having annular seats to receive ball or roller bearings (not shown) for mounting a supporting wheel which is schematically represented by the force vector S.

Mounted preferably on the lower portion of the axle 10 adjacent each spindle portion 12 is a hollow spring pad 15 having side sections 16 and end or top sections 17 extending integrally from a center or bottom section 18 to provide basically a square or rectangular cross-sectional configuration. The side sections 16 are provided with aligned semi-circular edges 19 (FIG. 1) which engage a lower circumferential portion of the axle 10 and the top sections 17 are provided with straight edges 20 which engage a longitudinal portion of the axle.

In accordance with the basic concept of the invention, each spring support pad 15 is secured to the tubular axle 10 exclusively by welds 22 which join the straight edges 20 of the pad to the tubular axle along a line parallel to the axis 11. The welds 22 are spaced generally midway between the top and bottom surfaces of the axle so that the welds are diametrically opposite and lie substantially in a horizontal plane extending through the neutral bending plane of the axle 10 and through the axis 11. A leaf spring 25 is mounted on the surface 26 of the bottom section 18 of each support pad 15 and is held firmly against the surface by a pair of U-bolts 28 which extend around the axle 10 and depend downwardly to receive a clamping member 30 which is retained by the nuts 32. It is to be understood, however, that it is within the scope of the present invention to mount the support pad 15 and spring 25 on the top side of the axle 10 and still obtain the advantages and features of the invention.

To provide an economical construction, preferably each support pad 16 is formed from a flat sheet of steel and is blanked in accordance with the outline shown in FIG. 4. The blank is then formed 90° along the dotted lines 35 and 36 to form the symmetrical box-like structure shown in FIGS. 1–3. The edges 20 of each pad are then secured to the tubular axis 10 by the welds 22 so that the top sections 17 of the pads lie in a common horizontal plane extending parallel to the axis 11.

As a result of securing the spring support pads 15 to the tubular axle 10 by the welds 22 which lie in a horizontal axial plane, it can be seen that the support pads 15 are joined to the axle 10 in an area of neutral stress. Thus if the axle 10 is accidentally overheated or undercut during the welding operation, the strength of the axle is not significantly affected since the maximum stresses are on the top and bottom portions of the axle and directly under the load application as illustrated by the force vector L.

Furthermore, it can be seen that all of the welds 22 can be made from above with a downwardly extending electrode while the axle 10 is resting on the spring support pads 15 supported by a flat surface. In addition, by constructing the spring pads 15 from a flat plate as shown in FIG. 4, the semi-circular edges 19 and straight edges 20 formed on the pads 15 can be easily modified for receiving axles of different sizes simply by interchanging die inserts which form the edges 19 and 20. Also it can be seen that the length of the welds 22 have been substantially reduced or minimized when compared with the circumferential welds which have been used prior to the present invention.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. An improved support axle and spring assembly adapted to reduce axle failure when the assembly is subjected to a high stress, comprising an elongated axle, a spring pad mounted transversely on said axle and surrounding substantially one-half of the outer periphery of said axle, a spring mounted on said pad and extending therefrom, means for securing said spring to said pad, weld means securing said pad to said axle, and substantially all of said weld means extending generally in the neutral bending plane passing through the axis of said axle to provide a rigid connection between said pad and said axle within an area of substantially neutral stress so that the strength of said axle is essentially unaffected by said weld means.

2. An improved support axle and spring assembly adapted to reduce axle failure when the assembly is subjected to a high stress, comprising an elongated tubular axle, a tubular spring pad mounted transversely on said axle and surrounding substantially one-half of the outer periphery of said axle, a leaf spring mounted on said pad and extending therefrom, means for securing said spring to said pad, a pair of welds securing said pad to said axle, and said welds extending exclusively in the neutral bending plane passing through the axis of said axle to provide a rigid connection between said pad and said axle within an area of substantially neutral stress so that the strength of said axle is essentially unaffected by said welds.

3. An improved support axle and spring assembly adapted to reduce axle failure when the assembly is subjected to a high stress, comprising a cylindrical tubular axle having a spindle member mounted in each end, a tubular spring pad formed of sheet metal and mounted transversely on said axle and formed to surround substantially one-half of the outer circumference of said axle, a leaf spring mounted on said pad and extending therefrom, U-bolt means for securing said spring to said pad, a pair of welds securing said pad to said axle, and said welds extending exclusively in the neutral plane passing through the axis of said axle to provide a rigid connection between said pad and said axle within an area of substantially neutral stress so that the strength of said axle is essentially unaffected by said weld.

4. An improved spring support pad formed from a flat metal sheet and adapted to be welded on a tubular axle in an area of neutral stress to reduce axle failure when subjected to high stress, comprising a generally symmetrically formed box-like member including integral side sections extending from a common center section and a pair of end sections extending from said side sections, said side and end sections respectively having openings therein formed according to the cross-sectional size of the axle so that said member generally surrounds one-half of the outer periphery of the axle, and said end sections cooperatively defining generally straight edges adapted to lie in the neutral bending plane extending through the axis of the axle so that the strength of the axle is essentially unaffected by welding said edges to the axle.

References Cited
UNITED STATES PATENTS

| | | | |
|---|---|---|---|
| 2,157,499 | 5/1939 | Rossmann | 267—52 |
| 2,907,579 | 10/1959 | Masser | 267—52 |
| 3,080,161 | 3/1963 | Felburn | 267—52 |
| 3,144,246 | 8/1964 | Hamlet | 267—52 |

ARTHUR L. LA POINT, *Primary Examiner.*

R. M. WOHLFARTH, *Assistant Examiner.*